United States Patent [19]

Studer et al.

[11] Patent Number: 4,772,796
[45] Date of Patent: Sep. 20, 1988

[54] IONIZING RADIATION DOSIMETRIC SYSTEM

[75] Inventors: Christian Studer, Athis Mons; Bernard Duzon, Rueil Malmaison; Michel J. Marot, Choisy Le Roi, all of France

[73] Assignee: Etat Francais, Paris Armees, France

[21] Appl. No.: 829,115

[22] Filed: Feb. 14, 1986

[30] Foreign Application Priority Data

Feb. 19, 1985 [FR] France .................................. 85 02342

[51] Int. Cl.$^4$ ............................................. G01J 1/58
[52] U.S. Cl. .................................. 250/485.1; 250/484.1
[58] Field of Search ............. 250/484.1, 485.1, 486.1, 250/337

[56] References Cited

U.S. PATENT DOCUMENTS

3,169,188 2/1965 Horner et al. ...................... 250/484.1
3,426,197 2/1969 Waly et al. ........................ 250/484.1

FOREIGN PATENT DOCUMENTS

2511160 2/1983 France ............................. 250/484.1

*Primary Examiner*—Janice A. Howell
*Assistant Examiner*—Richard Hanig
*Attorney, Agent, or Firm*—Parkhurst & Oliff

[57] ABSTRACT

The disclosed dosimeter system includes a dosimeter and a reader, the dosimeter including a protective outer container and a support for elements sensitive to radiation, the reader including a frame and a mechanism for receiving the dosimeter. The frame has a cover for supporting measurement devices and a source, and a base for guiding the mechanism which receives the dosimeter. The dosimeter support includes a casing having a movable body for the sensitive elements. The mechanism of the reader has a first shuttle which separates the casing from the body to lock the casing and convey the body and casing to a measurement position, and a second shuttle for immobilizing the body. The system provides for automatic opening, closing and reading of the dosimeter.

6 Claims, 4 Drawing Sheets

IONIZING RADIATION DOSIMETRIC SYSTEM

BACKGROUND OF THE INVENTION

1. Field of the Invention

The present invention relates to the field of dosimetric system for measuring doses of ionizing radiation, in particular gamma radiation and thermal neutrons from nuclear explosions.

2. Description of the Prior Art

A dosimetric device already exists for measuring the doses of radiation absorbed by living beings. This device is described in patent FR 2 511 160, and includes in particular a dosimetric complex including one or more dose detectors placed inside an enclosure, and one reader. This reader includes, in particular an extraction device that opens the dosimeter inside the reader, means for reading the radiation doses and means for reassembling the dosimeter. Various safety systems are provided to keep from opening the device if the dosimeter has not been reassembled.

The main disadvantage of this device resides not only in the means needed but in the complexity of the dosimetric system, requiring complex manual rotation and translation to obtain the glass measurement and recover the dosimeter.

OBJECT OF THE INVENTION

The object of the present invention is to create a dosimetric system in which the disassembly of the dosimeter and the measurements are entirely automatic except for the insertion and recovery operations.

SUMMARY OF THE INVENTION

Accordingly, a radiation dosimeter system is provided including at least one dosimeter consisting of one protective outer container and one support enclosing sensitive elements such as gamma radiation and thermal or "slow" neutron sensors and a semiconductor device sensitive to fast neutrons. The system also includes one reader consisting of one frame and one mechanism receiving the dosimeter, equipped with an ultra-violet ray excitation source, one device measuring the radiation emitted by the sensors and one device measuring electrical signals from the semiconductor device. The dosimeter support is fitted with a casing and consists of a body including the sensitive elements locked by a plate, including a sealing means at one end, and a snapping means at the other end of the casing. The reader frame consists of two parts, one being a cover supporting the source and the measuring devices and the other being a base guiding the reception mechanism, with said mechanism including means for opening the dosimeter, blocking the case and translating the body and casing assembly to the measuring position in combination with a drive means, and a second means for immobilizing the body.

The dosimeter body may have an enlongated cylindrical shape with two radial stepped holes carrying the sensors, and a third longitudinal hole carrying the semiconductor device, with the lockplate holding to these three sensor elements.

The body may be fitted at one end with a base, generally cylindrical in shape and of diameter larger than that of the body, with a groove cooperating with the second means of reception, on the one hand, and the snap shaft on the other hand, with a circular groove in the vicinity of its conic extremity.

The casing may be tubular with an inside diameter roughly equal to or greater than the body diameter, and may be provided at one end with an off-centered hole corresponding to the shaft of the body, and a blind hole open to the outside.

Means may be provided to seal the casing with the shaft and the casing with the body.

The snap shaft may cooperate with the springs, which are part of the casing, to lock the body in the casing.

The first means may consist of a shuttle, sliding with respect to the frame, including a peg to retract the springs and a lever whose one end fits into a notch in the casing under the action of a spring and of a pin at the other end, the translation of the shuttle separating the body from the casing.

The second means may consist of a shuttle with a step that the base presses against, and may include a lock lever hooked onto the dosimeter base, spring loaded at one end and acted on by a peg on the other end, locking the body in the shuttle, the spring being integral with shuttle and the peg being integral with the frame.

The peg may be part of a lever actuated by a trap that is part of the shuttle.

The driving means may consist of a system for pulling and a gear train system with automatic return.

The driving means may be connected to the shuttles by a spring and rack meshing with a toothed wheel in the gear train.

The excitation source may cooperate with a reflector mirror to excite the sensitive elements simultaneously, the radiation emitted by each element being selected with an occulation bar. The dosimeter identification may be written in coded form on the plate, which the read head itself reads as the shuttles move.

One advantage resulting from the present invention resides in the fact that all the measurement phases occur in sequence automatically without moving the measurement glasses.

Another advantage resides in the fact that the dosimeter is opened by translation only, inside the reader.

Another result resides in the speed of the reading, with no manual adjustment needed.

In accordance with another feature of the invention, the dosimetric system measures and indicates separately the doses of gamma and neutron rays due to initial radiation from fallout subsequent to nuclear explosions. The dosimeter is thus carried by an individual, for example on the individual's chest or wrist, and is sealed against dust, aerosols and water for a two-hour immersion in a depth of one meter of water. The dosimeter is also inviolable by the wearer, who cannot disassemble any of its parts. Finally, it includes a sensor that is sensitive to gamma radiation, and another that is sensitive to both gamma radiation and thermal neutrons. The high-speed component of the neutron radiation is detected by a silicon diode.

DETAILED DESCRIPTION OF THE DRAWINGS

Further advantages and features of this invention will be apparent from the following detailed description of several embodiments of this invention with reference to the corresponding accompanying drawings in which.

DESCRIPTION OF THE PREFERRED EMBODIMENT

Figure 1:
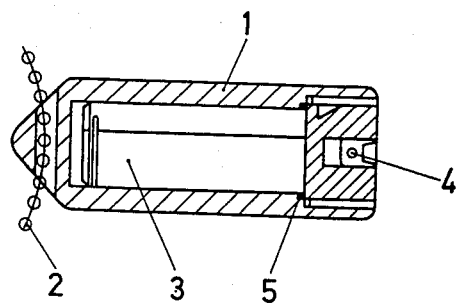
FIG. 1 is a schematic cross section of the dosimeter.

The dosimeter shown in FIG. 1 includes one protective outer container 1 receiving a handling device 2 allowing it to be handled and moved continuously. The dosimeter support 3 is placed inside this outer container and is held captive by an inviolable closing device 4.

This closing device 4 is part of the support 3 and consists of a lock that cannot be retracted except with a special tool.

Figure 2B:
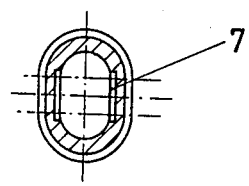
FIGS. 2a and 2b are examples of one embodiment of the dosimeter outer container.
Figure 2A:
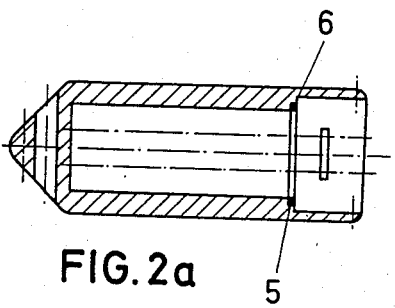

An O-ring 5, placed in groove 6 of the outer container, seals against dust, aerosols and liquids. FIG. 2b shows an opening 7 set for the lock elements.

The outer container is fabricated in a material that provides the spectral compensation. The outer container is indeformable and resists impacts and all climatic and atmospheric environments. As an example, an outer container made of plastic loaded with a tin-lead mixture meets these requirements.

Figure 3B:
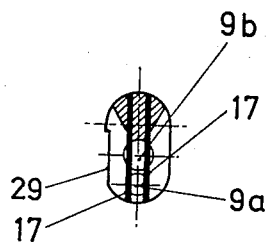
FIGS. 3a, 3b, 3c and 3d are schematics of the dosimeter body casing.
Figure 3A:
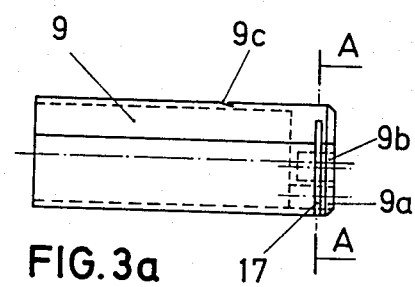
Figure 3C:
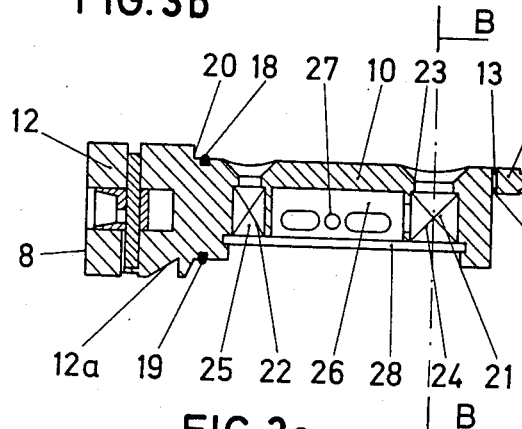

FIGS. 3a and b show the casing, and the body is illustrated in FIGS. 3c and d. l These two elements constitute the support 3 of the dosimeter.

The casing 9 is tubular in form and is made of the same material as the outer container. Its inside diameter is roughly equal to or greater than the outside diameter of the body. One end of the casing block is drilled with one off-centered hole 9a and one blind hole 9b facing outside and located near the casing centerline. The casing has one notch 9c on the side.

The body 10 may be made of the same material as the outer container. It includes a snap shaft or pin 11 at one end and a heel 12 at the other end. This pin 11 receives one seal 13 in circular groove 14 to seal the shaft with the casing. The shaft 11 comes to a conic point 15 at the end and carries a circular groove 16 just under this conic point, cooperating with two springs 17 (FIGS. 3a and b) that are part of the casing. These two springs come out in blind hole 9a with its longitudinal centerline, drilled in the casing and serving a purpose explained hereafter. When snapping in place, the conic end 15 separates the two springs 17 and, when the shaft reaches its end stop, the springs return to their initial position inside the groove 16, thus snapping in place. The seal between the body and casing on the end of heel 12 is provided by an O-ring 18 placed in a circular groove 19 in the body.

Heel 12 provides the seal with outer container 1 at shoulder 20, in combination with seal 18. The sealing function is thus separate from the locking function. The face 8 of heel 12 can be seen from the outside and can carry an alphanumerical registration number for the dosimeter.

The body 10 is in the shape of an elongated cylinder and encloses the sensitive elements of the dosimeter. It includes two open, parallel cavities 21 and 22 cut crosswise a distance apart. Each cavity features a step 23 on the same side. Each cavity receives one sensitive element 24 or 25 pressing against step 23. Each cavity is of a different length to keep from installing the glasses in reverse. The cavity 21 receives, for example, a cylindrical glass 24 of silver metaphosphate, specially doped to absorb the gamma radiation. The cavity 22 also receives a cylindrical glass 25 of silver metaphosphate specially doped to absorb neutron radiation. A third cavity 26 is provided between the first two cavities and receives one silicon diode 27 to measure the fast component of the neutron radiation. The diode is of the type having two contacts and is inserted in an insulator block of a assymetrical shape to make only one direction of insolution possible and avoid any reversal.

The two glasses 24 and 25, of different lengths, and the silicon diode are held in their respective cavities by plate 28, which fits into a groove around the perimeter of the support.

Plate 28 may carry the dosimeter registration data on its external face, along with data concerning certain characteristics of the neutron diode.

Figure 3D:
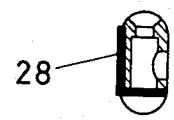

FIG. 3d shows a particular L-shaped embodiment of the plate 28.

FIG. 3b shows a cross section of the casing where the casing has an external longitudinal step 29 cooperating with the reader.

This arrangement prevents any reversal in the direction in which the dosimeter is inserted into the reader.

Figure 4:
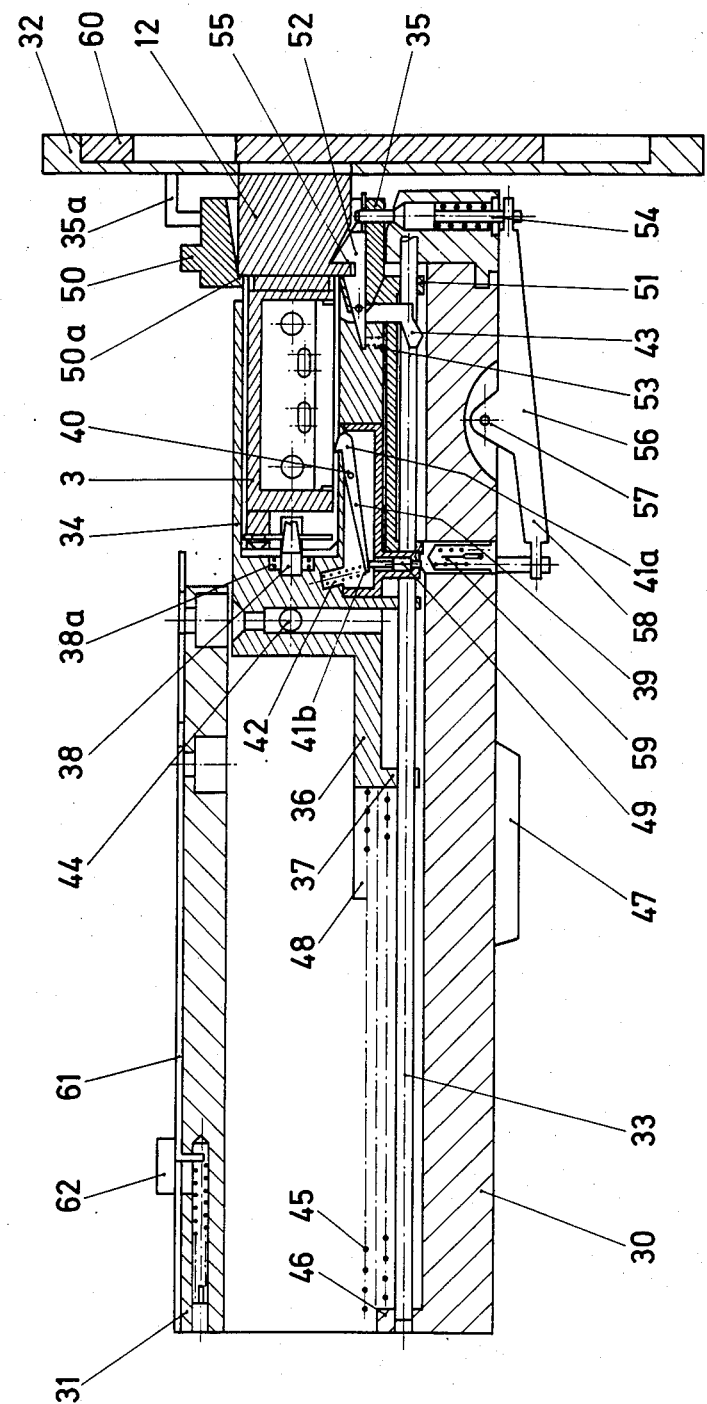
FIG. 4 is a schematic of the reader and dosimeter.

The reader shown in FIG. 4 includes a frame consisting of one base 30 and one cover 31 carrying the main elements. The cover 31 encloses the receiver mechanism and supports all of the electronic and mechanical elements controlling the dosimeter (detector, source, filters, diode contact, sensor), described in relation to the FIG. 6. It guides a means (described below) for occulting the radiophotoluminescent glasses and for initiating the measurements.

The base 30 is a ramp guiding the receiving mechanism and it receives the driving and safety mechanism used in moving the shuttles. The base and cover are part of the counter plate, only the front face 32 of which is shown.

The base 30 is fitted with two rails 33 along which the receiving means slides, consisting of one first means 34 for opening the dosimeter and locking its casing, and one second means 35 for immobilizing the dosimeter body. The first means 34 consists of the a first shuttle 36, unlocking peg 38 and casing stop 39. Shuttle 36 slides along rail 33 on three legs 37 and is provided with an opening to receive the dosimeter on the casing side. Peg 38 has the form of a truncated cone and is surrounded by helical spring 38a, fastened to the shuttle in such way that it is in the centerline of blind hole 9b.

The purpose of this peg is to separate the spring 17 to free the dosimeter shaft 11. The stop 39 is constructed in the form of a lever pivoting about axis 40, including a hook 41a that hooks into the casing notch 9c at one end, the other end 41b being acted upon by spring 42. The shuttle 36 is provided with another cam 43 that will be explained hereafter, and with a standard glass 44. The shuttle 36 slides under the force of spring 45 hooked under tension to the shaft 46, which is part of the base 30. The end 41b of the stop 39 is also actuated by one pushrod 49 that is part of the shuttle 36.

The second means 35 consists of a second shuttle 50, also sliding along the rails on legs 51. This second shuttle 50 is provided with an opening for receiving and locking the heel 12 of the dosimeter. This dosimeter is also subject to the action of a locking lever 52 pivoting with respect to shuttle 50, actuated at one end by a spring 53 and at the other by a shaft. This lever is provided with a notch 55 cooperating with notch 12a in the heel of the dosimeter.

Base 30 supports the shaft 54 subject to the action of lever 56, which pivot with respect to this base at 57. The other end 58 of the lever 56 is connected to a shaft 59 acting on pushrod 49.

Figure 5A:
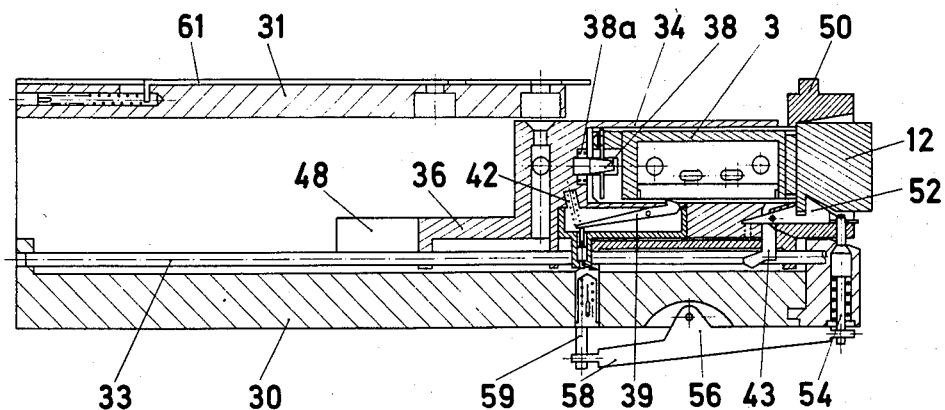
FIGS. 5a, 5b and 5c illustrate the operating phases of the reader.
Figure 5B:
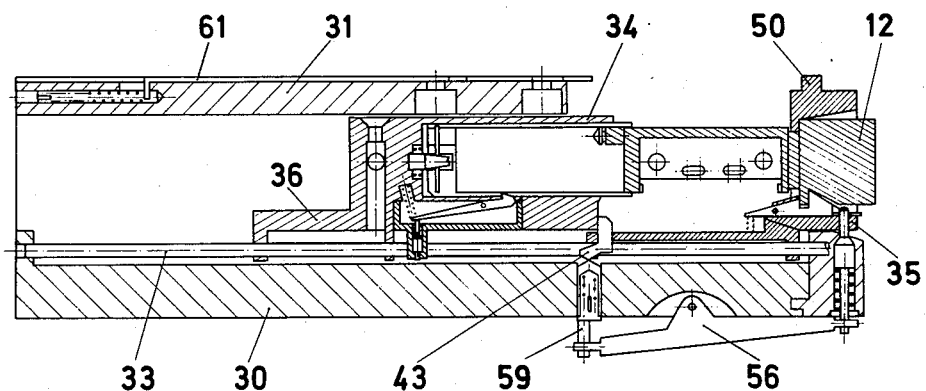
Figure 5C:
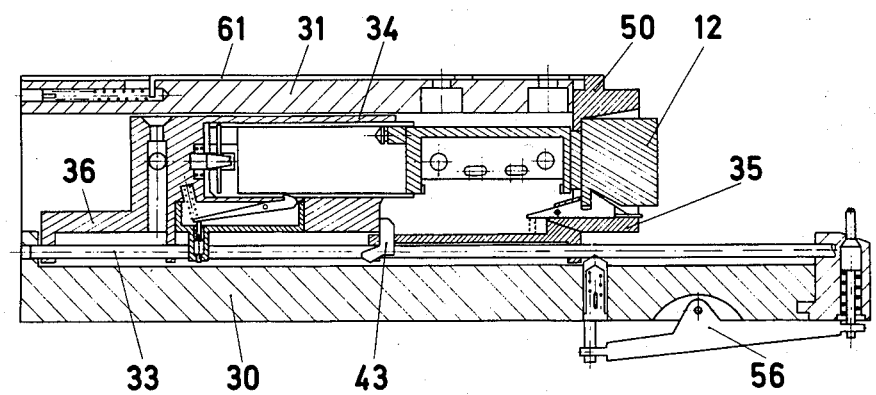

The mechanical operation is shown schematically in FIGS. 5a–5c. The dosimeter, taken out of its outer container, is inserted in the device when the trap 60 is opened. It then compresses the spring 38a. FIG. 5A illustrates this first phase, where the first shuttle 36 is blocked by shuttle 48 and the second shuttle 50 by shaft 59.

The peg 38 drives the springs 17, which free the snap shaft 11. However, the casing and body of the dosimeter are held in position relative to each other by stop 39 and lever 52 under the action of springs 42 and 53. When trap 60 is closed and locked in measuring position, this retracts the lock element 35a of the second means 35.

The shuttle 36, actuated by spring 45, starts its course of travel and passes into the intermediate position illustrated in FIG. 5b, which shows the casing 9 driven by the shuttle while the body 10 remains blocked by the shuttle 50. The casing a then travels a distance approximately equal to the length of the body 10 and the sensitive elements (glasses and diode) are then visible and ready for measurement.

Cam 43 arrives at the level of shaft 59, which is then lowered and the second shuttle 50 is freed. The first shuttle 36 drives second shuttle 50 by cam 43 to the position illustrated in the FIG. 5c, showing that the casing and the body remain unmoved with respect to each other. During the movement of the two shuttles positioned in this way, plate 21, which can carry engraved information, enters the field of the read head information sensor 65, to deliver its information.

At the end of travel, the first shuttle 36 arrives at the stop on the cover 31 and the bar 61 occulting the measurement channels moves and actuates microswitch pushrod 62 of a microswitch that is not shown in the FIG., which starts the measurement cycle described with reference to FIG. 6.

Figure 6:
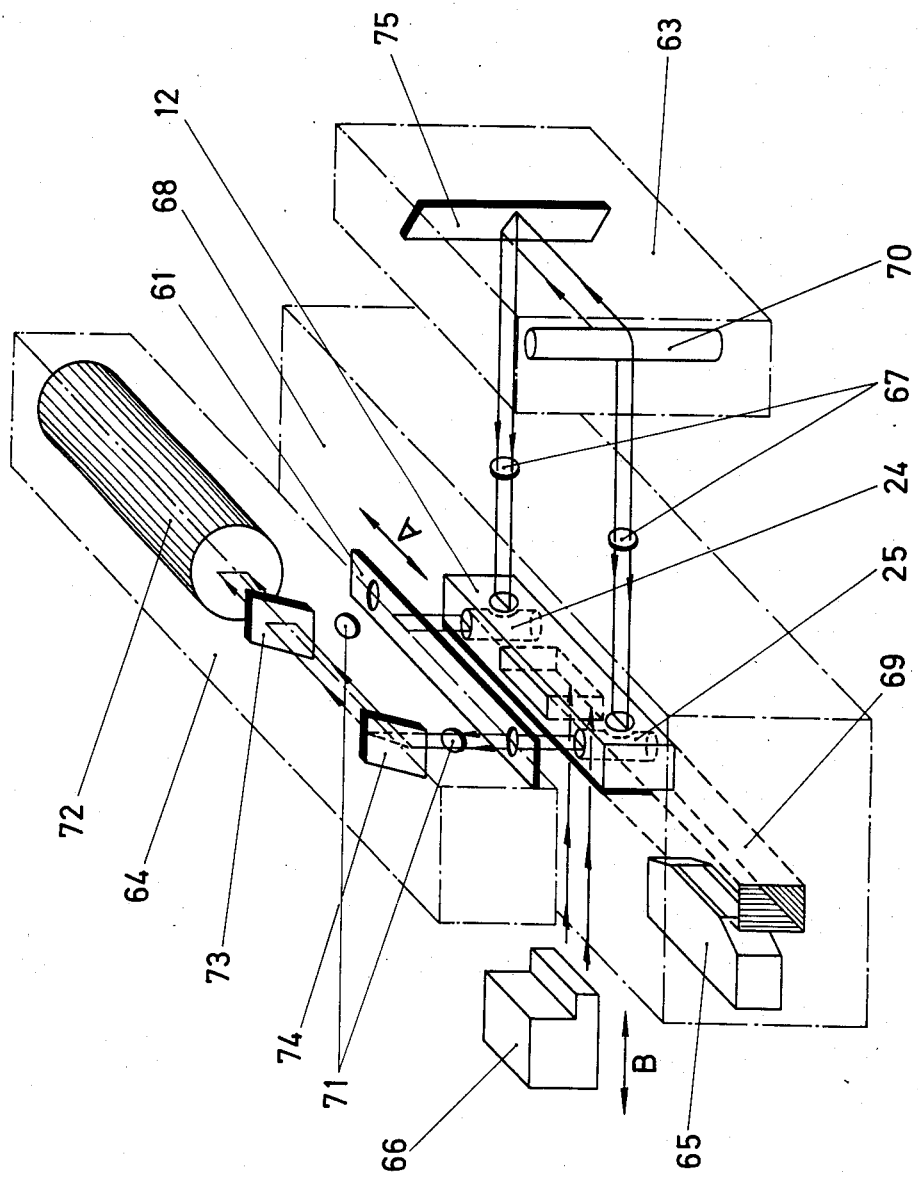
FIG. 6 illustrates the measurement principle of the reader schematically.

The measurement means are shown schematically in their relative position in space in FIG. 6, and consists of opto-electronic assemblies. They include a source of ultra-violet excitation 63, one detection component 64, one information sensor 65, one diode contact block 66 and filters 67 and 71. These elements form a compact assembly or read head, about which the electronic components can be arranged as needed for the various control functions. These functions are entirely conventional and do not require a description.

The frame 68 of the reader is located in a central position. The path of shuttles 36 and 5c is shown by 69. Information sensor 65 is fastened toward the front face of the frame. This sensor reads the information recorded on the plate, for processing and readout on the reader.

The excitation source 63 includes an ultra-violet lamp 70 which in the measurement phase excites, for example, the glass 25 of the filter 67. The luminescence produced by the glass 25 is directed toward the measurement detector 72 through the filter 71 and the mirror 74; The glass 24, also excited by the same radiation, flashes through the reflector mirror 75 and the filter 67. The luminescence produced is directed toward the detector 72 by filter 71, followed by the mirror 73. It is seeing that the excitation of each glass and the sensing of their luminescence is carried out along two orthogonal axes, the path of the beam emitted by the source being perpendicular to the path of the beam emitted by the glass. Furthermore, the excitation and the measurement are made without moving the glasses. The glass to be measured is selected by an electromagnet, by automatically moving bar 61 in the direction of arrow A, which blanks one of the channels.

To measure the neutron diode, the diode contact block 66 moves in the direction of arrow B at the time of the command to occult the first measured channel. This block connects the neutron diode 27 to an electronic subassembly of the reader, designed to measure the dose received by the diode.

All these electromagnetic operations are triggered when shuttle 50 arrives at its stop.

The operations proceed as follow: Before any insertion of the dosimeter, the electronic circuit can command a check of the calibration by exciting standard sensor 44 when the occulting bar 61 activates the microswith pushrod 62, the system is immobilized by electromagnetic safety and the luminescence of the glass 25 is measured.

After a first time delay, the electromagnet driving the blanking bar 61 is energized. This allows the occulting bar 61 to move, which drives the neutron diode measurement block 66 and blanks the glass 25 at the end of its course travel. A second time delay then occurs during which the luminescence of the glass 24 is measured.

After this second time delay, the electromagnet is no longer energized, which unlock the receiving mechanisms and returns block 66 to its initial position and bar 61 to the position for measuring the glass 25.

The first entirely automated part of the check cycle (measurement phase) is then finished and the manual operations for recovering the dosimeter begins. The operator, averted by a light or sound signal, then activates the ejection button (not shown). When this button is rotated, it acts directly on the gear train 47, causing the receiving mechanisms to move in the reverse direction, i.e. the phases illustrated in FIG. 5c, then 5b, then 5a. The return mouvement can be made with a rotation of about 110°. During this reverse course of travel, the shuttles 36 and 50 return to their initial position showing the FIG. 5a where the shuttle 50 is held by safety 59 and the shuttle 36 by the blocking element 35a. The return of the shuttle places spring 45 under tension.

Opening trap 60 by lever 56, in cooperation with levers 54 and 49, allows the safeties 52 and 39 to be retracted, thereby freeing the dosimeter. Once the dosimeter is no longer held in place, it is ejected under the action of the spring 38a.

The reader is again ready to excite a second example.

What we claim is:

1. Dosimetric system for ionizing radiation comprising:
   one dosimeter including one protective outer container and one support including sensitive elements sensitive to gamma and thermal or "slow" neutron radiation and one semiconductor device sensitive to fast neutrons,
   and one reader including a frame and a mechanism receiving the dosimeter, said frame comprising two parts, one part being a cover suppporting measurement devices and a source, the other part being a base for guiding said mechanism, said reader being fitted with a source of ultra-violet ray excitation and a device for measuring the radiation emitted by the sensitive elements and a device for measuring the electrical quantities related to the semiconductor device, wherein:

the dosimeter is fitted with a casing and comprises a body including the sensitive elements locked together by a plate, said body including at one end a sealing means and at the other end a means for snap-locking into the casing;

said mechanism of said reader includes a first shuttle sliding with respect to said frame to separate said casing from said body of said dosimeter by translation of said casing to lock said casing and convey said body and casing into a measuring position in combination with a driving means, and a second shuttle immobilizing said body;

the body of the dosimeter is in the shape of an elongated cylinder with two radial drilled holes each provided with a step in which the sensitive elements are placed, and a third longitudinal drilled hole in which the semiconductor device is placed, the locked plate being applied to these three sensitive elements;

the body is fitted at one end with a heel in the general form of a cylinder with a diameter greater than that of the body, and provided with a hatch cooperating with the second shuttle and with snap shaft carrying a circular groove near its conic end;

the casing is tubular and has an inside diameter roughly equal to or greater than the body diameter and has a solid section at one end provided with an off-centered hole cooperating with the pin of the body and a blind hole opened toward the outside;

sealing means are provided between the casing and pin and between the casing and the body;

the snap shaft cooperates with springs integral with the casing to lock the body to the casing;

the first shuttle includes a peg retracting the springs and a lever, one end of which fits into the notch cut out of the casing and subjected to the action of a spring and of a pin at the other end, wherein the translation of the shuttle separates the body from the casing; and the second shuttle is provided with a step on which the dosimeter heel presses and includes a locking lever hooked onto the dosimeter heel and subjected at one end to the action of a spring and at the other end to the action of a peg locking the body in the second shuttle, the spring being integral with the shuttle and the peg with the frame.

2. Dosimetric system as claimed in claim 1, wherein the peg is integral with a lever pivoted by a trap that is part of a counter plate.

3. Dosimetric system as claimed in claim 2, wherein the driving means consists of a pulling system and a gear train with automatic return.

4. Dosimetric system as claimed in claim 3, wherein the driving means is linked to the first and second shuttles by a spring and by a rack meshing with a toothed wheel in the gear train.

5. Dosimetric system as claimed in claim 4, wherein the source of excitation cooperates with a reflecting mirror to excite the sensitive elements simultaneously, with the radiation emitted by each element being selected by means of an occulting bar.

6. Dosimetric system as claimed in claim 5, wherein the dosimeter identification is written in code on the plate, which is itself read by the read head during the movements of the shuttles.

* * * * *